US010205670B2

(12) United States Patent
Tan et al.

(10) Patent No.: US 10,205,670 B2
(45) Date of Patent: Feb. 12, 2019

(54) SELECTIVE STORAGE AND DELETION IN MOBILE CONTENT DELIVERY NETWORKS

(71) Applicant: QUALCOMM Incorporated, San Diego, CA (US)

(72) Inventors: Bo Tan, Bridgewater, NJ (US); Jubin Jose, Bound Brook, NJ (US); Xinzhou Wu, Hillsborough, NJ (US); Junyi Li, Chester, NJ (US); Sanjay Shakkottai, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 14/485,372

(22) Filed: Sep. 12, 2014

(65) Prior Publication Data

US 2016/0080279 A1 Mar. 17, 2016

(51) Int. Cl.
*H04L 12/823* (2013.01)
*H04W 4/80* (2018.01)
(Continued)

(52) U.S. Cl.
CPC .............. *H04L 47/32* (2013.01); *H04L 67/12* (2013.01); *H04W 4/80* (2018.02); *H04W 40/20* (2013.01);
(Continued)

(58) Field of Classification Search
CPC ......... H04L 45/24; H04L 47/32; H04L 67/12; H04L 2012/40273; H04W 1/0084; H04W 4/023; H04W 4/008; H04W 40/023; H04W 40/20; H04W 40/38; H04W 64/006; H04W 84/005; H04W 84/18; H04W 4/80; G08G 1/09675; G08G 1/161
(Continued)

(56) References Cited

U.S. PATENT DOCUMENTS 5,570,367 A * 10/1996 Ayanoglu .............. H04L 1/1607
370/346
8,233,389 B2 7/2012 Yim et al.
(Continued)

FOREIGN PATENT DOCUMENTS

EP 1755094 A1 2/2007
EP 1788749 A1 5/2007
(Continued)

OTHER PUBLICATIONS

ISA/EPO, International Search Report and Written Opinion of the International Searching Authority, Int'l. App. No. PCT/US2015/044442, dated Nov. 26, 2015, European Patent Office, Rijswijk, NL, 14 pgs.
(Continued)

*Primary Examiner* — Khoa Huynh
(74) *Attorney, Agent, or Firm* — Holland & Hart LLP

(57) ABSTRACT

Methods, systems, and devices are described for storing and deleting received data packets over combined vehicular and wireless communications networks. In one example, an apparatus in a vehicular communication network may receive a data packet and may determine whether to store or delete the received data packet based on a ratio of distances between the data packet and its destination address as well as the data packet's source address and its destination address.

30 Claims, 11 Drawing Sheets

(51) Int. Cl.
*H04L 29/08* (2006.01)
*H04W 40/20* (2009.01)
*G08G 1/0967* (2006.01)
*G08G 1/16* (2006.01)
*H04W 40/02* (2009.01)
*H04W 84/00* (2009.01)
*H04W 84/18* (2009.01)

(52) U.S. Cl.
CPC ......... *G08G 1/09675* (2013.01); *G08G 1/161* (2013.01); *H04W 40/023* (2013.01); *H04W 84/005* (2013.01); *H04W 84/18* (2013.01)

(58) Field of Classification Search
USPC ........................................ 370/235; 455/456.1
See application file for complete search history.

(56) References Cited

U.S. PATENT DOCUMENTS

| | | | |
|---|---|---|---|
| 8,289,186 B2 | 10/2012 | Osafune | |
| 8,559,420 B1* | 10/2013 | Beard | H04L 29/06496 370/352 |
| 8,948,782 B2* | 2/2015 | Shang | H04W 4/023 455/456.1 |
| 2005/0036495 A1* | 2/2005 | Wishneusky | H04L 47/527 370/395.4 |
| 2005/0276253 A1* | 12/2005 | Ho | H04W 48/08 370/338 |
| 2007/0217372 A1 | 9/2007 | Gorday et al. | |
| 2008/0062901 A1* | 3/2008 | Kadowaki | H04L 1/00 370/310 |
| 2009/0045977 A1 | 2/2009 | Bai et al. | |
| 2009/0161567 A1* | 6/2009 | Jayawardena | H04L 43/0847 370/252 |
| 2010/0309783 A1* | 12/2010 | Howe | H04L 43/0852 370/230 |
| 2011/0227757 A1 | 9/2011 | Chen et al. | |
| 2012/0327840 A1 | 12/2012 | Chen et al. | |
| 2013/0034016 A1 | 2/2013 | Bai et al. | |
| 2013/0103781 A1* | 4/2013 | Mori | H04L 1/0084 709/213 |
| 2014/0105033 A1* | 4/2014 | Vasseur | H04L 45/24 370/248 |
| 2014/0179338 A1* | 6/2014 | Shang | H04W 4/023 455/456.1 |

FOREIGN PATENT DOCUMENTS

| | | | | |
|---|---|---|---|---|
| EP | 2523504 A1 | 11/2012 | | |
| JP | WO 2011083811 A1 * | 7/2011 | ............. | H04W 4/04 |

OTHER PUBLICATIONS

IPEA/EP, Second Written Opinion of the International Preliminary Examining Authority, Int'l Application No. PCT/US2015/044442, dated Sep. 29, 2016, European Patent Office, Munich, DE, 7 pgs.

* cited by examiner

US 10,205,670 B2

SELECTIVE STORAGE AND DELETION IN MOBILE CONTENT DELIVERY NETWORKS

BACKGROUND

The present disclosure, for example, relates to wireless communication systems, and more particularly to wireless communications involving a vehicular communication network.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

An additional example may include wireless communications between mobile vehicles (vehicular networking) or on other mobile networks having devices capable of physical movement which may be used for data delivery and content sharing. One example standard that may be used for mobile networks such as vehicular networking is the IEEE 802.11p protocol for Dedicated Short Range Communications (DSRC). The 802.11p protocol includes allocated channels for safety services as well as for peer-to-peer (P2P) file sharing and navigation software updates. Using this protocol, mobile networks could also be used to deliver delay-tolerant data transfers. Applications could include delivering high-quality videos to households, uploading large volumes of data created by businesses to cloud computing clusters, or transferring data between data centers at different geographical locations. A mobile network such as a vehicular communication network could also be used as a post-disaster communication network as an alternative to other communication networks.

Communications are typically broadcast within a mobile network such as a vehicular communication network. Even when a message or data packet is meant to be delivered from a source to a specific destination (a so-called unicast use case), the data packet is still broadcast, meaning that individual vehicles may be required to decide whether a received data packet meant for a different destination should be stored, deleted or forwarded. In some cases, data packets may be deleted by the vehicle instead of being stored or forwarded.

SUMMARY

A vehicle in a mobile or vehicular communication network may elect to delete a received data packet instead of storing or forwarding the data packet if certain conditions are met. Conditions that may be considered in deciding whether to delete a received data packet include whether the received packet is a duplicate of another packet already received by the vehicle, the proximity of the vehicle in possession of a received data packet to the received packet's destination while also considering a distance between the source of the data packet and its destination, and verifying that the received packet is not stale and that the vehicle has sufficient storage. The conditions for erasing a received data packet may be evaluated upon reception of the data packet and periodically after receipt of the data packet.

In a first illustrative embodiment, a method of wireless communication is described. The method may include receiving a first data packet at a vehicle in a vehicular network. The method may also include determining a first distance between the vehicle and a destination of the first data packet. Additionally, the method may include determining a second distance between a source of the first data packet and the destination of the first data packet. The method may also include determining a first ratio between the first distance and the second distance. The first data packet may be deleted if the first ratio exceeds a threshold ratio value.

In one aspect, the determining of the first distance may include determining a current route between the vehicle and the destination of the first data packet, while the determining of the second distance may include determining an original route between the source of the first data packet and the destination of the first data packet. The current route and the original route may be associated with a distance, or may be associated with a time period.

In another aspect, the method may further include deleting the first data packet if a duplicate of the first data packet was previously received by the vehicle. The method may also include deleting the first data packet if the first data packet is older than an expiration time indicated by the first data packet.

In another aspect, the method may further include determining a second ratio for a previously received data packet when an available storage space of the vehicle is below a threshold storage value, the second ratio being a ratio of a third distance between the vehicle and a previously received data packet destination of the previously received data packet and a fourth distance between a previously received data packet source of the previously received data packet and the previously received data packet destination of the previously received data packet. The method may also include deleting one of the first data packet or the previously received data packet based at least in part on a comparison of the first ratio and the second ratio. The deleting of one of the first data packet or the previously received data packet may include determining which of the first ratio and the second ratio is higher, and deleting either the first data packet or the previously received data packet that corresponds to the higher of the first ratio and the second ratio.

In yet another aspect, the method may include deleting one of the first data packet or a second received data packet based on a comparison of data packet storage time in a storage space for the vehicle. Other aspects of the method include determining the first ratio at a time that the first data packet is received and/or determining the first ratio periodically after the first data packet is received. In the method, the first data packet may be stored, deleted or forwarded. Additionally, in the method, the threshold ratio value may be larger than one.

In a second illustrative embodiment, an apparatus for wireless communication is described. The apparatus may include means for receiving a first data packet at a vehicle in a vehicular network, means for determining a first distance between the vehicle and a destination of the first data packet, and means for determining a second distance between a source of the first data packet and the destination of the first data packet. The apparatus may also include means for determining a first ratio between the first distance and the second distance, as well as means for deleting the first data packet if the first ratio exceeds a threshold ratio value.

In an aspect of the apparatus, the means for determining the first distance may include means for determining a current route between the vehicle and the destination of the first data packet, while the means for determining the second distance may include means for determining an original route between the source of the first data packet and the destination of the first data packet. The apparatus may also include means for deleting the first data packet if a duplicate of the first data packet was previously received by the vehicle. Additionally, the apparatus may include means for deleting the first data packet if the first data packet is older than an expiration time indicated by the first data packet.

In another aspect, the apparatus may include means for determining a second ratio for a previously received data packet when an available storage space of the vehicle is below a threshold storage value, the second ratio being a ratio of a third distance between the vehicle and a previously received data packet destination of the previously received data packet and a fourth distance between a previously received data packet source of the previously received data packet and the previously received data packet destination of the previously received data packet. The apparatus may further include means for deleting one of the first data packet or the previously received data packet based at least in part on a comparison of the first ratio and the second ratio. The means for deleting one of the first data packet or the previously received data packet may include means for determining which of the first ratio and the second ratio is higher, and means for deleting either the first data packet or the previously received data packet that corresponds to the higher of the first ratio and the second ratio.

In yet another aspect, the apparatus may include means for deleting one of the first data packet or a second received data packet based on a comparison of data packet storage time in a storage space for the vehicle. Means for determining the first ratio at a time that the first data packet is received may also be included in the apparatus, as may also means for determining the first ratio periodically after the first data packet is received.

In a third illustrative embodiment, an apparatus for wireless communication that includes a processor; memory in electronic communication with the processor; and instructions stored in the memory, is disclosed. The instructions may be executable by the processor to receive a first data packet at a vehicle in a vehicular network, determine a first distance between the vehicle and a destination of the first data packet, determine a second distance between a source of the first data packet and the destination of the first data packet, and determine a first ratio between the first distance and the second distance. The instructions may also be executable by the processor to delete the first data packet if the first ratio exceeds a threshold ratio value.

In one aspect of the apparatus, the instructions for determining the first distance may include instructions to determine a current route between the vehicle and the destination of the first data packet. In another aspect of the apparatus, the instructions for determining the second distance may include instructions to determine an original route between the source of the first data packet and the destination of the first data packet.

In an additional aspect, the apparatus may further include instructions to delete the first data packet if a duplicate of the first data packet was previously received by the vehicle. The instructions may also include instructions to delete the first data packet if the first data packet is older than an expiration time indicated by the first data packet.

In yet another illustrative embodiment, a non-transitory computer-readable medium storing computer-executable code for wireless communication is described. The code may be executable by a processor to receive a first data packet at a vehicle in a vehicular network, determine a first distance between the vehicle and a destination of the first data packet, determine a second distance between a source of the first data packet and the destination of the first data packet, determine a first ratio between the first distance and the second distance, and delete the first data packet if the first ratio exceeds a threshold ratio value. The code for determining the first distance may further include code executable by a processor to determine a current route between the vehicle and the destination of the first data packet. The code for determining the second distance may further include code executable by a processor to determine an original route between the source of the first data packet and the destination of the first data packet.

In an aspect, the non-transitory computer-readable medium may further include code executable by a processor to delete the first data packet if a duplicate of the first data packet was previously received by the vehicle. Additionally, the non-transitory computer-readable medium may further include code executable by a processor to delete the first data packet if the first data packet is older than an expiration time indicated by the first data packet.

The foregoing has outlined rather broadly the features and technical advantages of examples according to the disclosure in order that the detailed description that follows may be better understood. Additional features and advantages will be described hereinafter. The specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
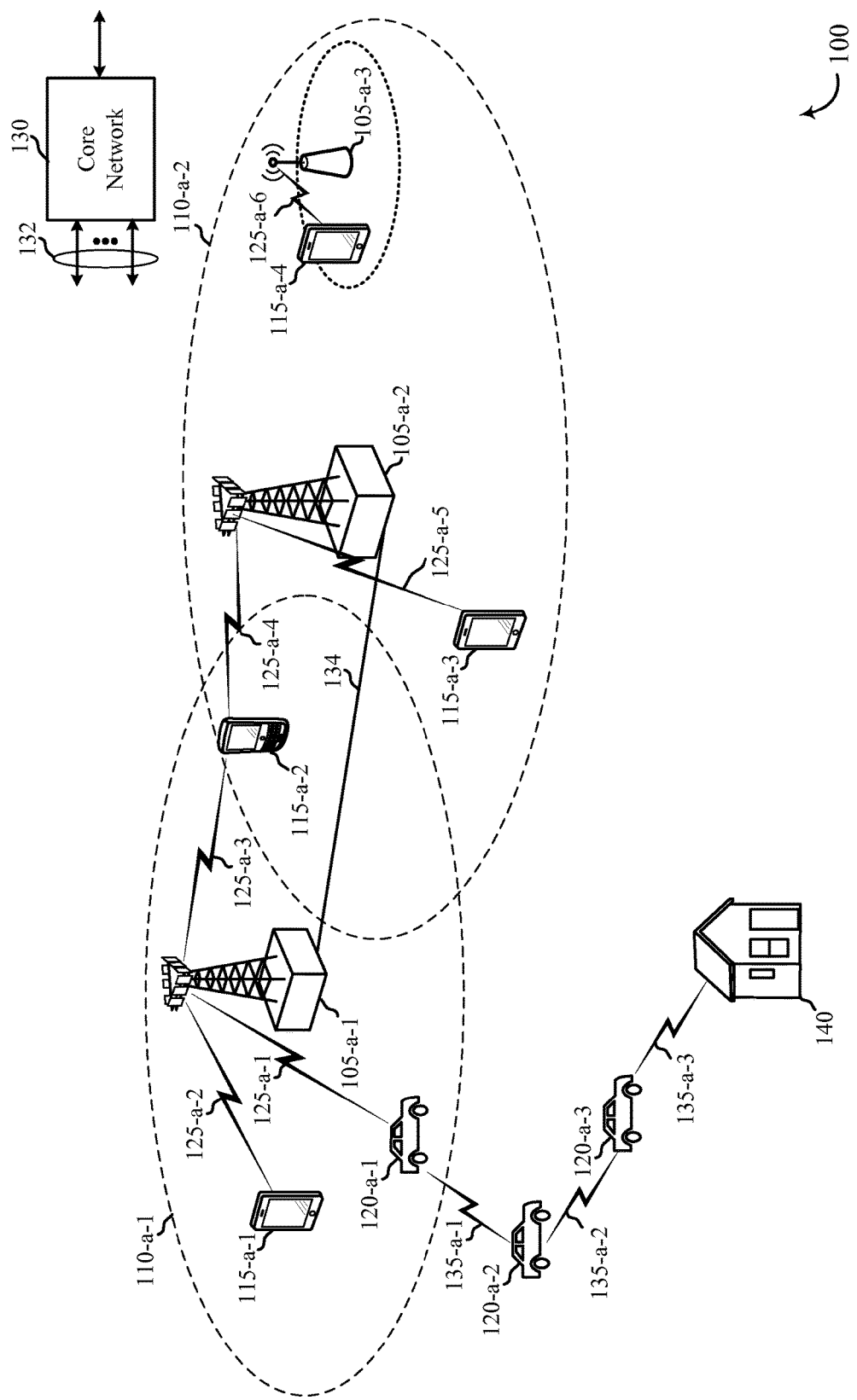
FIG. 1 shows an example of combined vehicular and wireless communications networks for transferring data, in accordance with various aspects of the present disclosure.

Individual vehicles in a vehicular communication network may determine whether to store, continue to store, delete or forward a received data packet. Due to limited storage capacity, for example, a vehicle may choose to delete some data packets instead of storing or forwarding the data packets. Deletion of data packets by a vehicle may occur if certain conditions are met. One condition that may be used by the vehicle in considering whether to delete a received data packet is whether the received data packet is a duplicate of another data packet already received by the vehicle. Reception of duplicate packets is an indication that one or more other vehicles are already forwarding the data packet. Vehicular communication networks typically include redundant broadcasts of data packets, meaning that multiple vehicles may each receive copies of the same data packet to be forwarded. When a vehicle later receives another copy of the data packet, the vehicle will have received the data packet from one of the other vehicles that may be already engaged in forwarding the data packets. Therefore, if a vehicle receives duplicate data packets, the vehicle can delete all of its received duplicate data packets.

Another condition may include consideration of the proximity of the vehicle in possession of a received data packet to the received data packet's destination. For example, the vehicle could determine a current route, which may be the shortest or fastest geographical route between the vehicle's current location and the destination of the received data packet. The vehicle may compare its current route with an original route, which may be the shortest or fastest geographical route between the source of the received data packet and the received data packet's destination. If a ratio of the current route to the original route exceeds a threshold amount, thus indicating that the received data packet has been moving farther away from its destination, the vehicle may choose to delete the received data packet. The task of forwarding the data packets is instead handled by other vehicles that had received the data packets and that are presumably moving in a better direction for the transmission of the data packets.

Other conditions may include verifying that the received data packet is not stale and that the vehicle has sufficient storage. For example, a received data packet may include a timeout field which may indicate an expiration time for the received data packet. A vehicle may elect to delete received data packets whose timeout fields have expired. Additionally, a vehicle may elect to delete one or more received data packets if the vehicle's storage space is constrained. In this case, the vehicle may delete an older or longer-stored data packet in favor of a newer or shorter-stored data packet. Alternatively, the vehicle may delete a stored data packet whose ratio of current route to original route is higher than that of a received data packet.

As used herein, the term "vehicle" may refer to any apparatus, machine, or device that is capable of both physical mobility and wireless communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the disclosure. The wireless communication system 100 includes base stations 105 (e.g., base stations 105-*a*-1, 105-*a*-2, 105-*a*-3), communication devices such as UEs 115 (e.g., UEs 115-*a*-1, 115-*a*-2, 115-*a*-3, 115-*a*-4), and a core network 130. The system may also include vehicles 120 (e.g., vehicles 120-*a*-1, 120-*a*-2, 120-*a*-3), which may be considered as a type of UE. The core network 130 may provide user authentication, access authorization, tracking, Internet Protocol (IP) connectivity, and other access, routing, or mobility functions. The base stations 105 interface with the core network 130 through backhaul 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul 134 (e.g., X1, etc.), which may be wired or wireless communication links.

The base stations 105 may wirelessly communicate with the UEs 115 and vehicles 120 via one or more base station antennas. Each of the base station 105 sites may provide communication coverage for a respective geographic coverage area 110 (e.g., geographic coverage areas 110-*a*-1, 110-*a*-2). In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be generally used to describe the base stations 105, while the term UE may be generally used to describe the UEs 115. The wireless communication system 100 may include a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 or vehicle 120 and the base stations 105 or core network 130 supporting radio bearers for the user plane data. At the Physical (PHY) layer, the transport channels may be mapped to Physical channels.

In some examples, the wireless communication system 100 may also include a vehicular communication network made up of vehicles 120. A vehicle 120 may be a consumer automobile, a commercial automobile (such as a parcel delivery truck or semi-truck), a non-motorized vehicle such as a bike, a train, an aircraft, and so forth. Vehicles 120 may include both physical mobility and wireless communications capabilities. The mobility of the vehicle may be controlled (e.g., a parcel delivery truck may take the same route every day) or uncontrolled (e.g., the owner of a consumer automobile may be free to operate the automobile in any manner he or she sees fit). Notwithstanding the possible uncontrollability of the vehicle, there may be some limits in the movement of the vehicle—i.e., the vehicle may be constrained to only drive on paved or semi-paved roads, with only minor deviations from established roads being possible (e.g., into parking lots, garages, etc.).

The UEs 115 and vehicles 120 are dispersed throughout the wireless communication system 100, and each UE 115 and/or vehicle 120 may be stationary or mobile. A UE 115 and/or vehicle 120 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 (e.g., communication links 125-*a*-1, 125-*a*-2, 125-*a*-3, 125-*a*-4, 125-*a*-5, 125-*a*-6) shown in wireless communication system 100 may include uplink (UL) transmissions from a UE 115 or vehicle 120 to a base station 105, and/or downlink (DL) transmissions, from a base station 105 to either a UE 115 or a vehicle 120. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Wireless communication links 135 (e.g., wireless communication links 135-*a*-1, 135-*a*-2, 135-*a*-3) may also be established among vehicles 120 using one or more wireless communication protocols, such as IEEE 802.11p, also known as Dedicated Short Range Communications (DSRC).

In some embodiments of the system 100, base stations 105, UEs 115 and/or vehicles 120 may include multiple antennas for employing antenna diversity schemes to improve communication quality and reliability between base stations 105 and UEs 115 or vehicles 120. Additionally or alternatively, base stations 105, UEs 115 and/or vehicles 120 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 or vehicle 120 may be configured with multiple downlink CCs and one or more uplink CCs for carrier aggregation. Carrier aggregation may be used with both FDD and TDD component carriers.

The system shown in FIG. 1 may be used in various examples of data transfers over combined vehicular and wireless communication networks. The base station 105-a and vehicle 120-a-1 may, for example, be part of a wireless communication network. Additionally, the vehicles 120-a-1, 120-a-2, 120-a-3 may together form a vehicular network with physical mobility. The vehicles 120 may communicate with each other via wireless communication links 135. By combining the vehicular and wireless communication networks in system 100, data transfers between two or more geographically separated areas may be effectuated. For example, as illustrated in FIG. 1, base station 105-a may wirelessly transmit a data packet to a first vehicle 120-a-1. The first vehicle 120-a-1 may then wirelessly transmit the data packet to a second vehicle 120-a-2, and the second vehicle 120-a-2 may wirelessly transmit the data packet to a third vehicle 120-a-3. The third vehicle 120-a-3 may, in turn, transmit the data packet to a stationary node 140.

Although FIG. 1 shows the data packet originating from the base station 105-a and ending at stationary node 140, in other embodiments, the data packet may originate from a stationary node, and end at a different stationary node, or the data packet may originate from a base station and end at a different base station, or the data packet may originate from a stationary node and end at a base station. In general, the data packet may be transferred over any number of nodes using the combined vehicular and wireless communication networks in any manner.

The combined vehicular and wireless communication networks in system 100 may form a vehicular backbone network (VBN) which may be used to transfer large amounts of data over both short and long distances. The VBN thus formed may rely on both vehicle-to-vehicle (V2V) and vehicle-to-infrastructure (V2I) communications, with the capacity of data transfer (speed and volume) determined by the vehicular traffic intensity, the size of the data cache on each vehicle (i.e., how much data each vehicle can carry at any given time), and the wireless communication resources available. Although the use of vehicles 120 to transfer data may introduce a delay as compared to, for example, the nearly instantaneous data transfers made possible by the Internet, there are many applications where such a delay is tolerable or even desirable, such as backup data, or data transfers between large data centers. Furthermore, such a vehicular-based network can be used even in situations where the Internet is not available, such as after a natural disaster that destroys infrastructure, or in underdeveloped areas of the world that may not have a high bandwidth connection to the Internet.

The vehicles 120 in system 100 may, however, have limited storage capacity. As a result, the vehicles 120 may determine that not every received data packet is to be stored or forwarded. Instead, some received data packets may be deleted, in accordance with aspects of the present disclosure and as described in further detail below.

Figure 2:
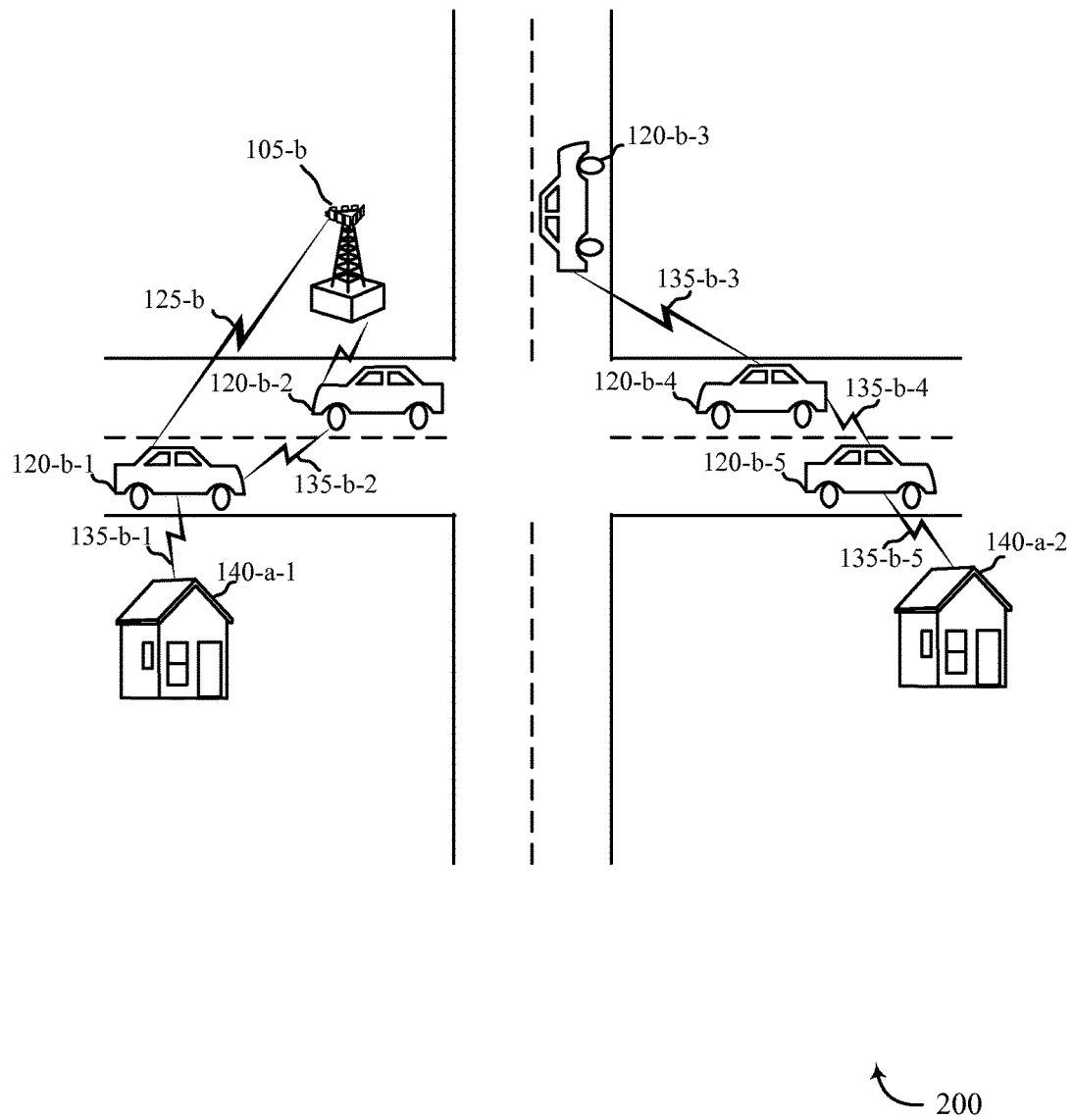
FIG. 2 shows an example of combined vehicular and wireless communications networks for transferring data, in accordance with various aspects of the present disclosure.

FIG. 2 is an illustration of a wireless communication system 200 for transferring data over combined vehicular and wireless communication networks, in accordance with various embodiments. FIG. 2 illustrates a plurality of vehicles 120-b-1, 120-b-2, 120-b-3, 120-b-4, 120-b-5, a base station 105-b, and a plurality of wireless communication links 135-b-1, 135-b-2, 135-b-3, 135-b-4, 135-b-5 used to transfer data from a source node 140-a-1 to a destination node 140-a-2. The vehicles 120-b-1, 120-b-2, 120-b-3, 120-b-4, 120-b-5 may be examples of the vehicles 120 of FIG. 1, and the base station 105-b may be an example of the base stations 105 of FIG. 1.

In one example, a data packet (or a plurality of data packets) to be transferred is uploaded from source node 140-a-1 to a first vehicle 120-b-1 using wireless communication link 135-b-1. The vehicle 120-b-1 may also receive information from another vehicle 120-b-2 over the wireless communication link 135-b-2 and/or from the base station 105-b over the wireless communication link 125-b, which information may include information regarding a status of the wireless network and an ability of neighboring vehicles (such as vehicle 120-b-2) to participate in the vehicular network. Once the vehicle 120-b-1 receives the data packet (or plurality of data packets), the vehicle may decide whether to store the received data packets for eventual forwarding to another vehicle or destination, or to delete the received data packets.

If the vehicle 120-b-1 elects to store the received data packets, the vehicle 120-b-1 may travel for some distance and then forward the data packets. As an example, the wireless communication system 200 shows a vehicle 120-b-3 which may elect to wirelessly transmit information to one or more other vehicles, or even to a stationary node, in order for the transmitted data packets to be transferred to destination node 140-a-2. As illustrated in FIG. 2, there are generally two types of wireless transfers between vehicles that may occur during the data transfer operation. For example, a vehicle 120-b-3 may wirelessly transmit a data packet to another vehicle 120-b-4 using wireless communications link 135-b-3 at an intersection (which may be called "intersection switching"). Also, a vehicle 120-b-4 may wirelessly transmit a data packet to another vehicle 120-b-5 using wireless communications link 135-b-4 on a single road segment (which may be called "u-turn switching"). Ultimately, once a vehicle carrying the data packet arrives within wireless communication range (e.g., transmission range) of the destination node 140-a-2, the vehicle 120-b-5 may use wireless communications link 135-b-5 to wirelessly transmit the data packet to the destination node 140-a-2. It will be noted that the simplified example given in FIG. 2 is merely illustrative, and that many more segments and wireless switching between vehicles may be needed for any given data packet to reach its intended destination node.

In some embodiments, the wireless spectrum available for wireless data transfers may need to be shared if two or more vehicles 120 are close enough to one another. Such sharing of the wireless spectrum may reduce the speed at which some data can be transferred, including the data transfers from the source node 140-a-1 to the first vehicle 120-b-1 on the data transfer path, from the last vehicle 120-b-5 on the data transfer path to the destination node 140-a-2, intersection switching data transfers, and/or u-turn switching data transfers. In some embodiments carrier sense multiple access (CSMA) techniques may be employed to help reduce interfering transmissions on the shared wireless spectrum.

Figure 3:
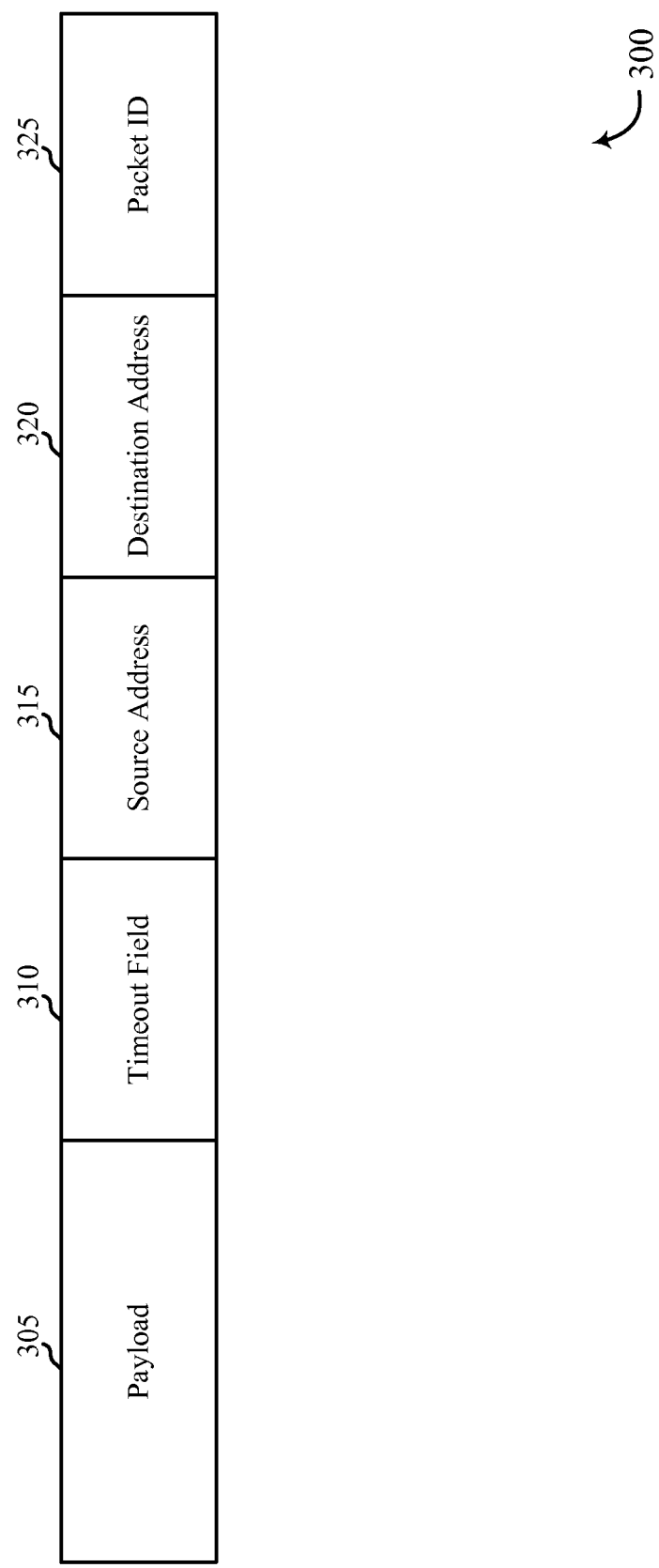
FIG. 3 shows an example of a data packet to be used in a vehicular network, in accordance with various aspects of the present disclosure.

FIG. 3 shows a block diagram of an example of a data packet 300 that can be transferred over combined vehicular and wireless communication networks in accordance with various embodiments. The data packet 300 may be examples of the data packets transmitted on wireless communication links 135 of FIGS. 1 and/or 2.

The data packet 300 may include a payload 305 that contains the body data of the data transmission. That is, the payload 305 may be the data desired to be transmitted via the transmission. The data packet 300 may further include a timeout field 310. The timeout field 310 may identify a time by which the data packet 300 is considered to be expired. Alternatively, the timeout field 310 may include a duration of time, at which the expiration thereof, the data packet 300 is considered to be expired. When the data packet 300 is expired, a device storing the data packet 300 for transmission, such as a vehicle 120, may delete the data packet 300. In some examples, the vehicle 120 may not transmit the data packet 300 after the expiration of the timeout field 310.

The data packet 300 may also include a source address 315 and a destination address 320. The source address 315 may identify a geographical source of the data packet 300. The destination address 320 may identify a geographical destination of the data packet 300. A vehicle having received the data packet 300 may determine the geographic source and/or destination of the data packet 300 by reading the source address 315 and/or the destination address 320. In some examples, the geographical source and/or destination is a physical address, and in other examples, the geographic source and/or destination is actually a particular device or node from which the data packet 300 originated or to which the data packet 300 is intended. The data packet 300 may also contain a packet identification (ID) 325 which uniquely identifies the data packet 300.

Figure 4:
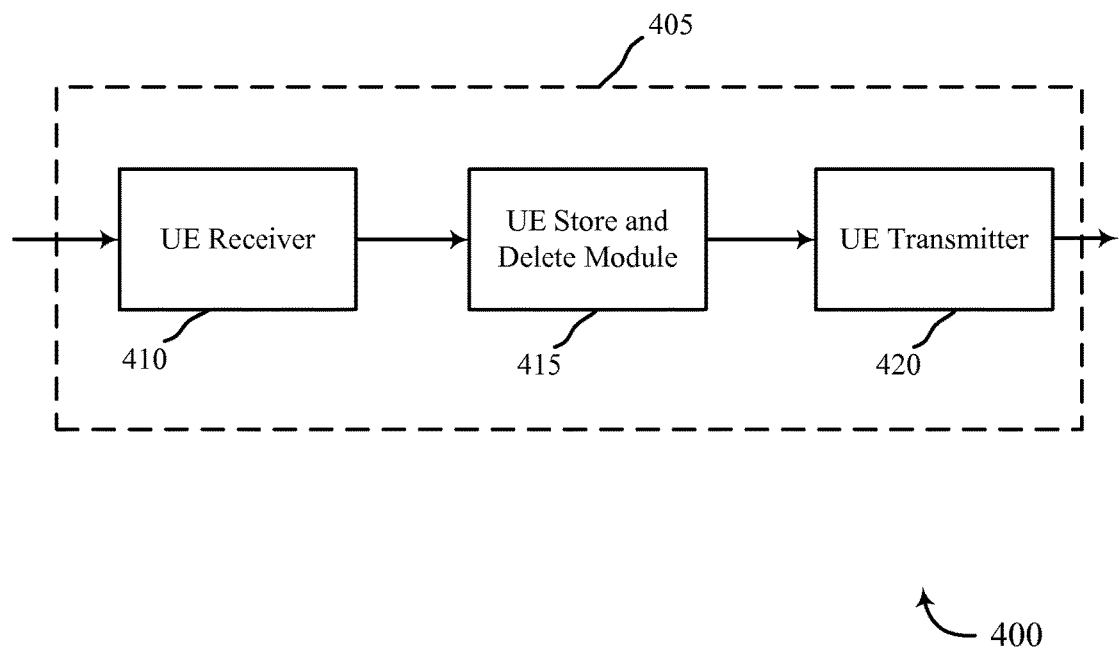
FIG. 4 shows a block diagram of a device configured for use in a vehicular communication network, in accordance with various aspects of the present disclosure.

FIG. 4 shows a block diagram 400 of an example of an apparatus 405 for use in a vehicular communication network in accordance with various embodiments. The apparatus 405 may participate in the transfer of one or more data packets, such as a data packet 300 of FIG. 3. The apparatus 405 may be, for example, one of the vehicles 120 shown in FIGS. 1 and/or 2. The apparatus 405 shown in FIG. 4 includes a UE receiver 410, a UE store and delete module 415, and a UE transmitter 420. Each of these components may be in communication with each other.

The UE receiver 410 may receive information such as data packets, user data, vehicle data, and/or control information associated with various information channels (e.g., control channels, data channels, etc.). Received information may be passed on to the UE store and delete module 415, and to other components of the apparatus 405. For example, the UE receiver 410 may receive data packets that are to be transferred between two geographically separate locations. Additionally, the UE receiver 410 may also receive information regarding maps and/or road segments (corresponding to available routes for the data packet to take to reach a given destination). The UE receiver 410 may receive data packets and information over one or more wireless communication links using one or more radio access technologies—for example, LTE, Wi-Fi, DSRC, and so forth.

The UE store and delete module 415 may be configured to identify a data packet received from a source. The source may be a vehicle or a stationary transmitter in some embodiments, and the UE store and delete module 415 may be configured to identify the data packet through the packet's source address. Alternatively, the data packet may include a destination address, and the UE store and delete module 415 may be configured to identify the data packet through the packet's destination address. The data packet may also have a unique packet ID which may be used by the UE store and delete module 415 to identify the data packet. The UE store and delete module 415 may also be configured to determine, based at least in part on the information included in the data packet, whether to store the data packet for eventual forwarding to another node, or to delete the received data packet, as described in greater detail below.

The UE transmitter 420 may transmit one or more signals received from other components of the apparatus 405. For example, the UE transmitter 420 may transmit a data packet that the apparatus 405 has previously received, and/or the UE transmitter 420 may transmit information to one or more vehicles or to a network infrastructure associated with the combined vehicular and wireless communication networks. In some embodiments, the UE transmitter 420 may be collocated with the UE receiver 410 in a transceiver module. The UE transmitter 420 may transmit packets and information over one or more wireless protocols—for example, LTE, Wi-Fi, DSRC, and so forth.

Figure 5:
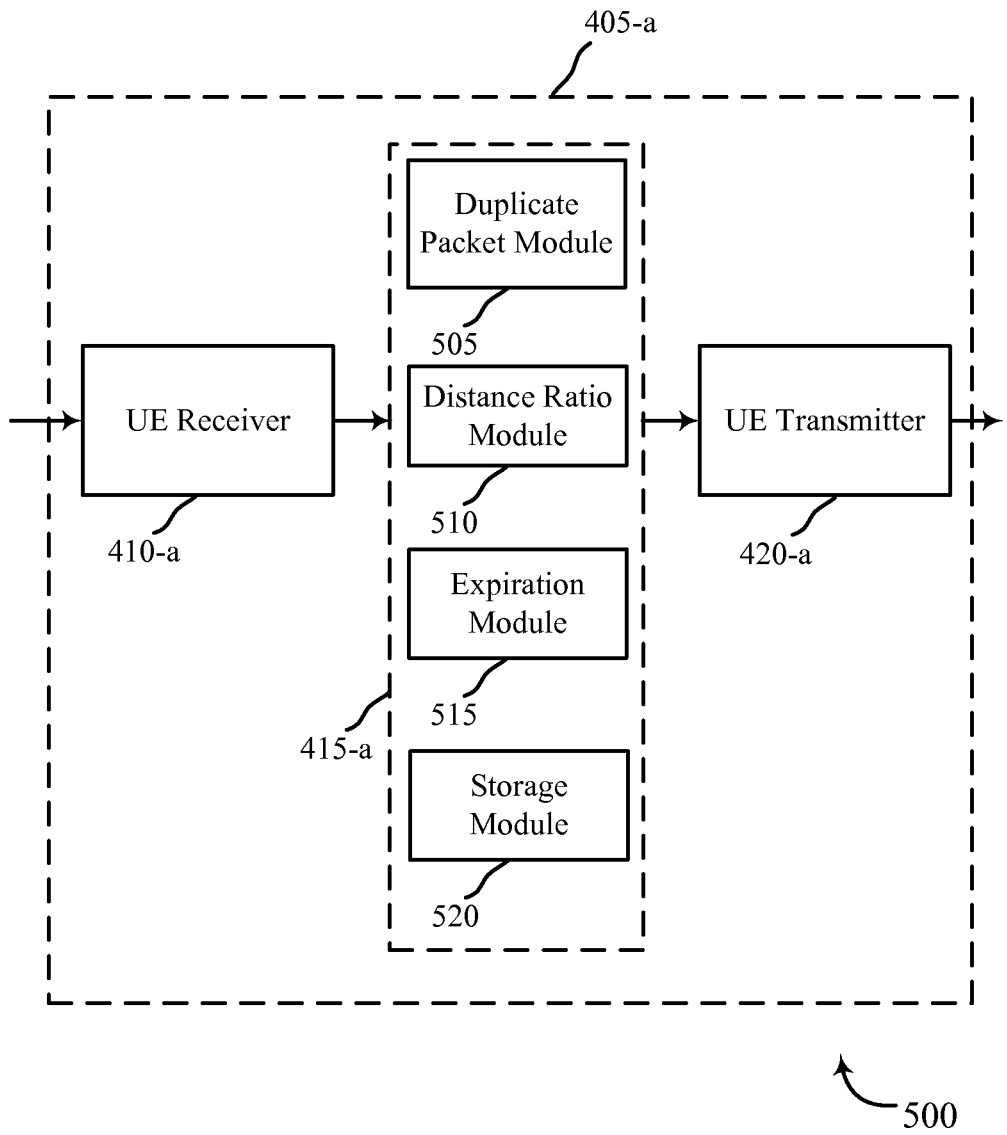
FIG. 5 shows a block diagram of a device configured for use in a vehicular communication network, in accordance with various aspects of the present disclosure.

FIG. 5 shows a block diagram 500 of another example of an apparatus 405-a for use in a vehicular communication network in accordance with various embodiments. The apparatus 405-a may be, for example, one of the vehicles 120 shown in FIGS. 1 and/or 2 and may be an example of one or more aspects of the apparatus 405 described with reference to FIG. 4. The apparatus 405-a shown in FIG. 5 includes a UE receiver 410-a, a UE store and delete module 415-a, and a UE transmitter 420-a. Each of these components may be in communication with each other. The UE store and delete module 415-a in FIG. 5 may include a duplicate packet module 505, a distance ratio module 510, an expiration module 515, and/or a storage module 520.

The UE receiver 410-a may receive data packets, for example, as described above with reference to FIG. 4. The data packets may be passed on to the UE store and delete module 415-a and to other components of the apparatus 405-a. The UE store and delete module 415-a may be configured to perform the operations described above with reference to the store and delete module 415 shown in FIG. 4, such as deciding whether to store or delete a received data packet. The UE transmitter 420-a may be used to transmit the one or more data packets received and stored by the apparatus 405-a, as described above with reference to FIG. 4.

The duplicate packet module 505, the distance ratio module 510, the expiration module 515 and the storage module 520 may each be configured to receive, provide, and/or analyze information to aid in the selection of a data packet for either storage or deletion.

For example, the duplicate packet module 505 may be configured to determine whether a received data packet is a duplicate of a previously received data packet. Using, for example, the packet ID or a combination of other information included in the data packet (including the source and/or destination addresses or even information determined from the payload), the duplicate packet module 505 may identify a received packet. The data used to identify the received packet may also be used to compare the received packet identity with other previously received packets. Such comparison may require that the UE store and delete module 415-a maintain a list of identifications for received data packets. Such a list could be included within a storage device or database table, for example. Using the stored information, the duplicate packet module 505 may search the identifications of previously received data packets and determine whether a newly received data packet is a duplicate. If a duplicate data packet is discovered, both the newly received data packet and its duplicate may be deleted by the duplicate packet module 505. Receipt by the apparatus 405-a of a duplicate data packet is an indication that another vehicle has also received the data packet and has started forwarding the data packet, meaning that it is likely not necessary for the current vehicle to also attempt to forward the received data packet.

Another factor considered by the UE store and delete module 415-a in deciding whether to delete a received data packet is based on the proximity of the apparatus 405-a to the data packet's intended destination. To this end, the distance ratio module 510 may be used to determine the destination address of the received data packet and to then determine a distance between the apparatus 405-a and the data packet's destination. Determination of the data packet's destination may be accomplished by evaluating the destination address included in the data packet, as illustrated in the data packet 300 of FIG. 3. The distance determination may be made by determining a geographically shortest route between the apparatus 405-a and the data packet's destination. A geographically shortest route refers to that route that a vehicle in the vehicular network could take from the location of the apparatus 405-a to the data packet's destination that is the shortest possible route for the vehicle. The possible routes considered by the distance ratio module 510 may be constrained by the types of roads the vehicle may travel on, and may be influenced by either a vehicle navigation system (such as a global positioning system (GPS)) or by vehicle navigation information received at the vehicle from an external source. The distance determination may also be made by determining a geographically quickest route between the apparatus 405-a and the data packet's destination. A geographically quickest route refers to that route that a vehicle in the vehicular network could take that is quickest between the location of the apparatus 405-a and the data packet's destination. A geographically quickest route may differ from a geographically shortest route due to traffic and road conditions (such as construction, etc.). Once again, a vehicle navigation system or GPS may be used in determining the geographically quickest route.

The distance ratio module 510 may also be used to determine an original distance between the data packet's source address and the data packet's destination address. Determination of the original distance may be made by evaluating the source address and the destination address included in the data packet, as illustrated in the data packet 300 of FIG. 3. Using the source and destination addresses, the distance ratio module 510 may determine a route such as the geographically shortest or quickest routes and an original distance of the determined route. Alternatively, the distance ratio module 510 could receive the determined original distance from other external sources such as a base station 105.

Using the determined current distance and original distance, the distance ratio module 510 may determine a ratio of the two distances. For example, the distance ratio module 510 may determine a current distance-to-original distance ratio and then compare the ratio with a predetermined threshold value. Typically, the predetermined threshold value is greater than one, which would represent a current distance that is greater than an original distance, meaning that the data packet received by the vehicle is further away from its destination than when it was at its source address. If the determined distance ratio is greater than the predetermined threshold value, the vehicle may assume that the data packet is traveling away from its intended destination address (via the vehicle). In this situation, the vehicle may elect to delete the received data packet.

The expiration module 515 may be used to determine whether a data packet has expired and thus should be deleted. In one example, the expiration module 515 may consider the timeout field 310 of data packet 300 of FIG. 3. If the timeout field 310 indicates that the data packet has expired, meaning that the indicated time has elapsed, the expiration module 515 may elect to delete the received packet. This check of the timeout field 310 by the expiration module 515 may occur as a data packet is received, but may also be applied to previously stored data packets, as described in further detail below. Operation of the expiration module 515 on previously stored data packets may occur periodically, as set by a timer, for example, or may be triggered when other data packets are newly received.

The storage module 520 may also be used to determine whether a data packet should be deleted. If the apparatus 405-a determines that a received data packet should be stored, the storage module 520 may be used to determine whether the storage capacity of the vehicle is limited and nearing capacity. If capacity is limited, the storage module 520 may be used to determine if another previously stored data packet can be deleted in order to make room for the newly received data packet. In considering whether a previously stored data packet should be deleted in favor of the newly received data packet, the storage module 520 may consider the time that a previously received data packet has been stored in the vehicle. For example, a data packet that has been stored for longer than a predetermined storage threshold value may be determined to have been stored for too long and that it may be deleted in favor of a newer data packet. Long storage of a data packet may indicate that the carrying vehicle has not had opportunities to forward the data packet, which might mean that the carrying vehicle is travelling in a wrong direction for the data packet.

The storage module 520 may also use the distance ratio module 510 to determine distance ratios for previously received data packets and then compare the distance ratios for previously received data packets with the distance ratio of a newly received data packet. A previously received data packet having a distance ratio greater than that of a newly received data packet may be deleted in favor of the newly received data packet.

Figure 6:
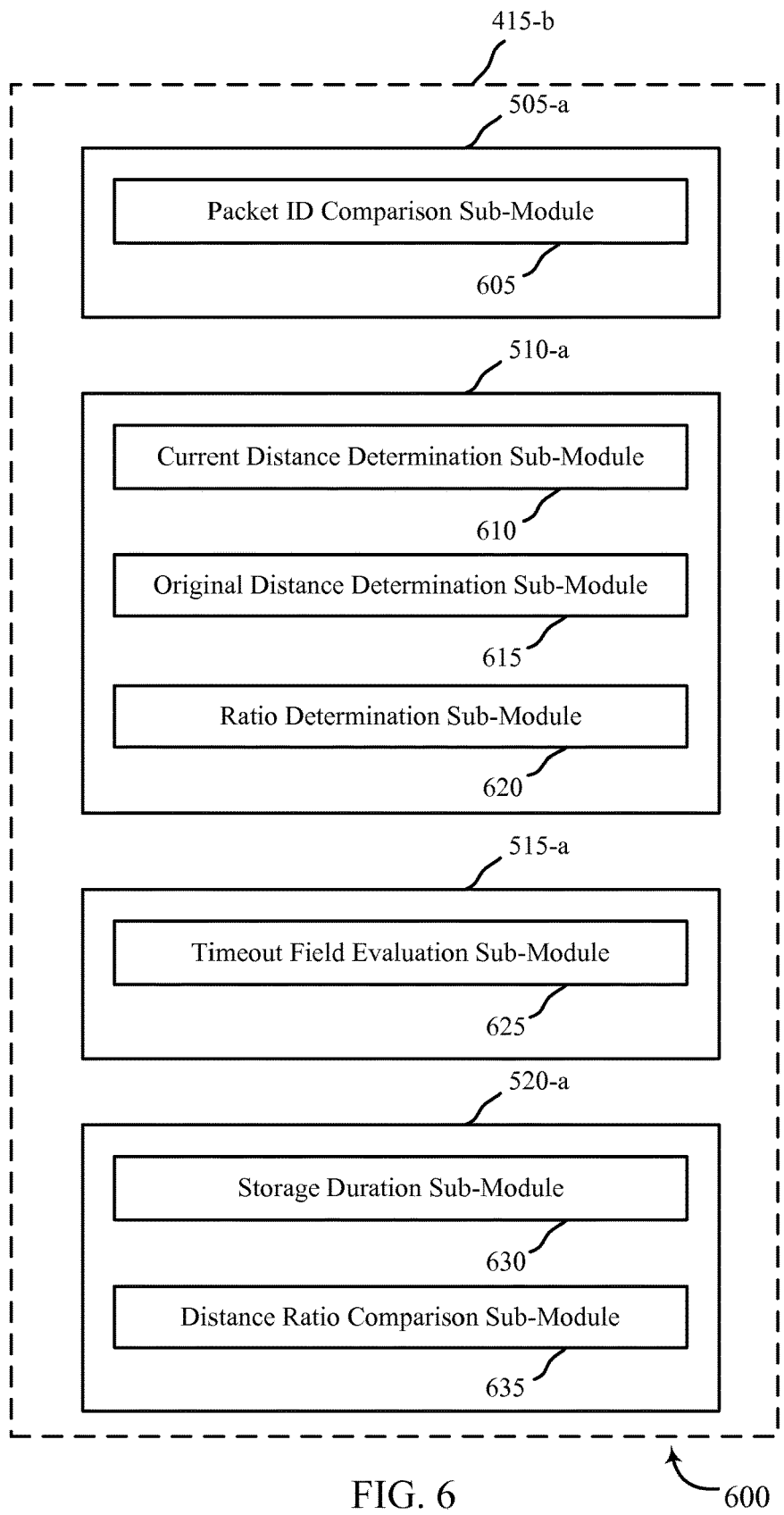
FIG. 6 shows a block diagram of a device configured for use in a vehicular communication network, in accordance with various aspects of the present disclosure.

FIG. 6 shows a block diagram 600 of an example of a store and delete module 415-b for use in a vehicular communication network, in accordance with various embodiments. The store and delete module 415-b may be an example of one or more aspects of the store and delete modules 415 described with reference to FIGS. 4 and/or 5, and may be configured to perform the operations described above with reference to FIGS. 4 and/or 5. The store and delete module 415-b in FIG. 6 may include a duplicate packet module 505-a, a distance ratio module 510-a, an expiration module 515-a, and a storage module 520-a.

The duplicate packet module 505-a shown in FIG. 6 may further include a packet ID comparison sub-module 605. The packet ID comparison sub-module 605 may be used by the duplicate packet module 505-a to determine whether a newly received data packet is a duplicate of a previously received data packet by comparing the packet IDs of the data packets. A positive comparison of packet IDs indicates that the newly received data packet is a duplicate, and both it and the duplicate previously received data packet may be deleted.

The distance ratio module 510-a may include a current distance determination sub-module 610, an original distance determination sub-module 615, and a ratio determination sub-module 620. The current distance determination sub-module 610 may be used to determine the current distance between the apparatus 405-a and the destination address of a data packet. The original distance determination sub-module 615 may be used to determine the original distance between the source address and the destination address of the data packet. The current distance determination sub-module 610 and original distance determination sub-module 615 may determine distances based on either the shortest geographical distance or the quickest geographical distance, for example, or may use other algorithms for determining distance. The ratio determination sub-module 620 may use the determined current distance and original distance to determine a distance ratio for the data packet. If the data packet's distance ratio is greater than a predetermined distance ratio threshold, the data packet may be deleted.

The expiration module 515-a may include a timeout field evaluation sub-module 625, which may be used by the expiration module 515-a to determine whether a received or previously stored data packet is stale or has expired. The timeout field evaluation sub-module 625 may evaluate the timeout field of the data packet and determine whether an indicated time has elapsed such that that the data packet may be deleted. Furthermore, the expiration module 515-a may analyze one or more previously stored data packets on a scheduled basis in order to determine whether the analyzed data packet should be deleted.

The storage module 520-a may include a storage duration sub-module 630 and a distance ratio comparison sub-module 635. The storage duration sub-module 630 may be used by the storage module 520-a to determine whether a previously received data packet should be deleted in favor of a newly received data packet on the basis of data packet storage time. If a previously received data packet has been stored for longer than a predetermined threshold time (even if the previously received data packet has not yet expired based on the determination of the expiration module 515-a), the previously received data packet may be deleted in favor of the newly received data packet.

The distance ratio comparison sub-module 635 may be used by the storage module 520-a to determine whether a previously received data packet has a distance ratio that is greater than a distance ratio of a newly received data packet. Previously received data packets that have distance ratios that are greater than those of a newly received data packet may be deleted in favor of storing the newly received data packet.

Figure 7:
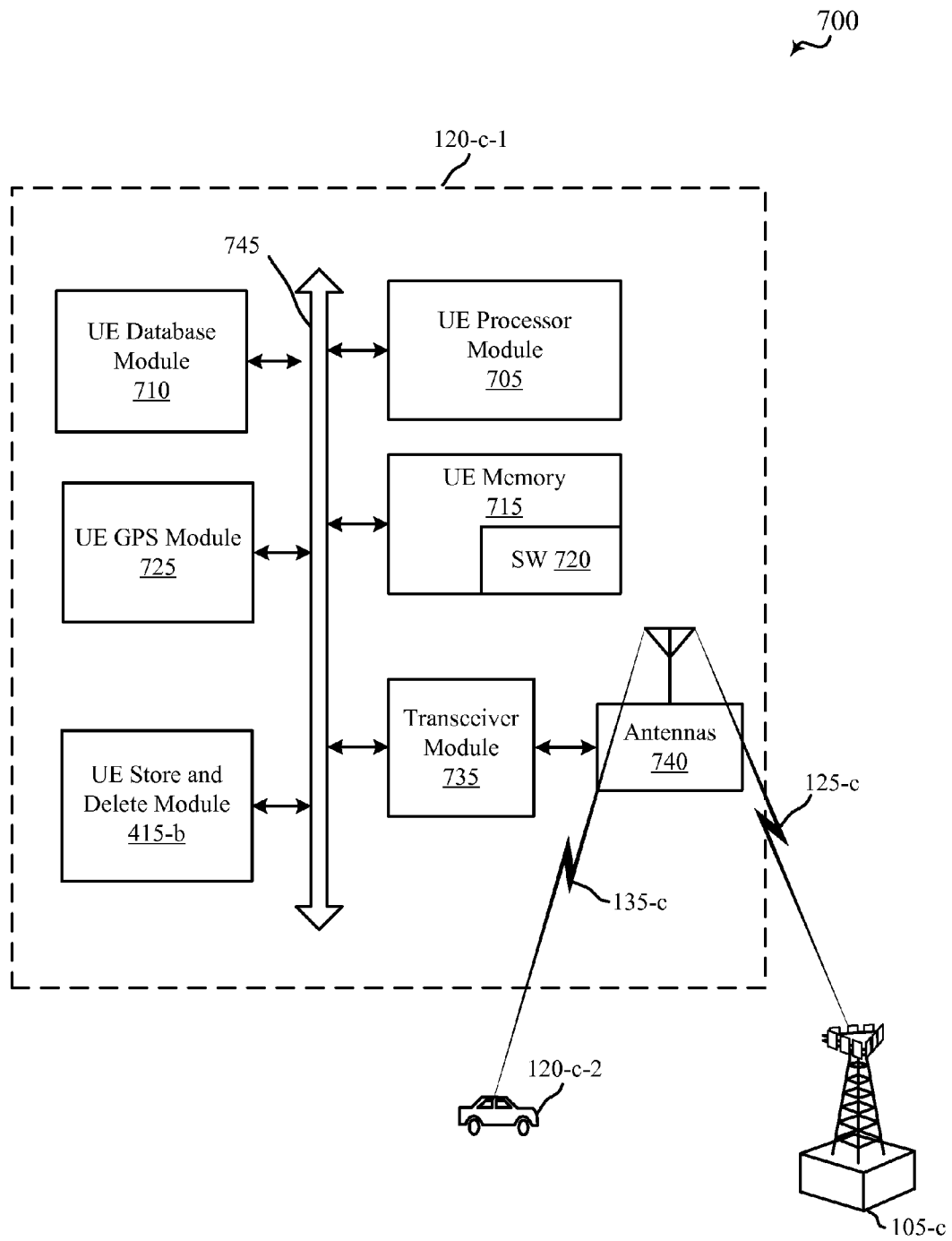
FIG. 7 shows a block diagram of a wireless communication system, in accordance with various aspects of the present disclosure.

FIG. 7 shows a diagram of a system 700 for receiving and storing/deleting data packets over combined vehicular and wireless communication networks in accordance with various embodiments. System 700 includes vehicles 120-c-1, 120-c-2 which may be examples of the vehicles 120 in FIGS. 1 and/or 2 or the apparatuses 405 in FIGS. 4-6. System 700 also includes a base station 105-c, which may be an example of the base station 105 in FIGS. 1 and/or 2.

The vehicle 120-c-1 shown in FIG. 7 includes antennas 740, a UE transceiver module 735, a UE processor module 705, and UE memory 715 (including software (SW) 720), which each may communicate, directly or indirectly, with each other (e.g., via one or more buses 745). The UE transceiver module 735 may be configured to communicate bi-directionally, via the antennas 740 and/or one or more wireless communication links 135-c, 125-c, with one or more other vehicles 120-c-2, one or more base stations 105-c or other nodes, as described above. The UE transceiver module 735 may include a modem configured to modulate the packets and provide the modulated packets to the antennas 740 for transmission, and to demodulate packets received from the antennas 740. While vehicle 120-c-1 may include a single antenna 740 in some embodiments, the vehicle 120-c-1 may alternatively have multiple antennas 740 capable of concurrently transmitting and/or receiving multiple wireless transmissions. The UE transceiver module 735 may thus be capable of concurrently communicating with one or more base stations 105-c and/or one or more other vehicles 120-c-2.

The UE memory 715 may include random access memory (RAM) and/or read-only memory (ROM). The UE memory 715 may store computer-readable, computer-executable software 720 containing instructions that are configured to, when executed, cause the UE processor module 705 to perform various functions described herein (e.g., determining whether a received data packet should be stored or deleted). Alternatively, the software 720 may not be directly executable by the UE processor module 705 but be configured to cause a computer (e.g., when compiled and executed) to perform functions described herein. The UE processor module 705 may include an intelligent hardware device, e.g., a central processing unit (CPU) such as an ARM® based processor or those made by Intel® Corporation or AMD®, a microcontroller, an application-specific integrated circuit (ASIC), etc., and may include random access memory (RAM) and read-only memory (ROM). In some embodiments, the UE memory 715 may include or be implemented as a hard drive.

The vehicle 120-c-1 also includes a UE database module 710, a UE GPS module 725, and a UE store and delete module 415-b, each of which may be coupled to bus 745 in order to allow communication with the other components of the vehicle 120-c-1. The UE database module 710 may include one or more databases, such as a map database, a road database, a data packet receive and/or storage time database, and so forth. The UE database module 710 may be configured to provide the UE store and delete module 415-b with access to its databases for use in determining resource allocations, such as whether vehicle 120-c-1 should store or delete a received data packet.

The UE GPS module 725 may include a GPS receiver configured to receive GPS signals and determine position, speed, timing, traffic considerations and other information associated with the vehicle 120-c-1 (including both current and past data), which can also be provided to the UE store and delete module 415-b.

The UE store and delete module 415-b may be an example of the UE store and delete modules 415 shown in FIGS. 4-6. The UE store and delete module 415-b may be configured to determine whether a received data packet is stored or deleted. For example, the UE store and delete module 415-b may consider whether a newly received data packet is a duplicate of a previously received data packet. The UE store and delete module 415-b may consider whether a newly received data packet has expired based on information received with the data packet. The UE store and delete module 415-b may consider a distance ratio of current distance-to-original distance for a received data packet and determine whether the distance ratio is greater than a predetermined threshold. In each of these determinations, the UE store and delete module 415-b may determine that the received data packet is to be deleted instead of stored. Alternatively, the UE store and delete module 415-b may determine that a newly received data packet is to be stored, but that a previously received data packet is to be deleted in favor of the newly received data packet. Such a decision may be based on storage duration as well as a comparison of data packet distance ratios, for example.

Figure 8:
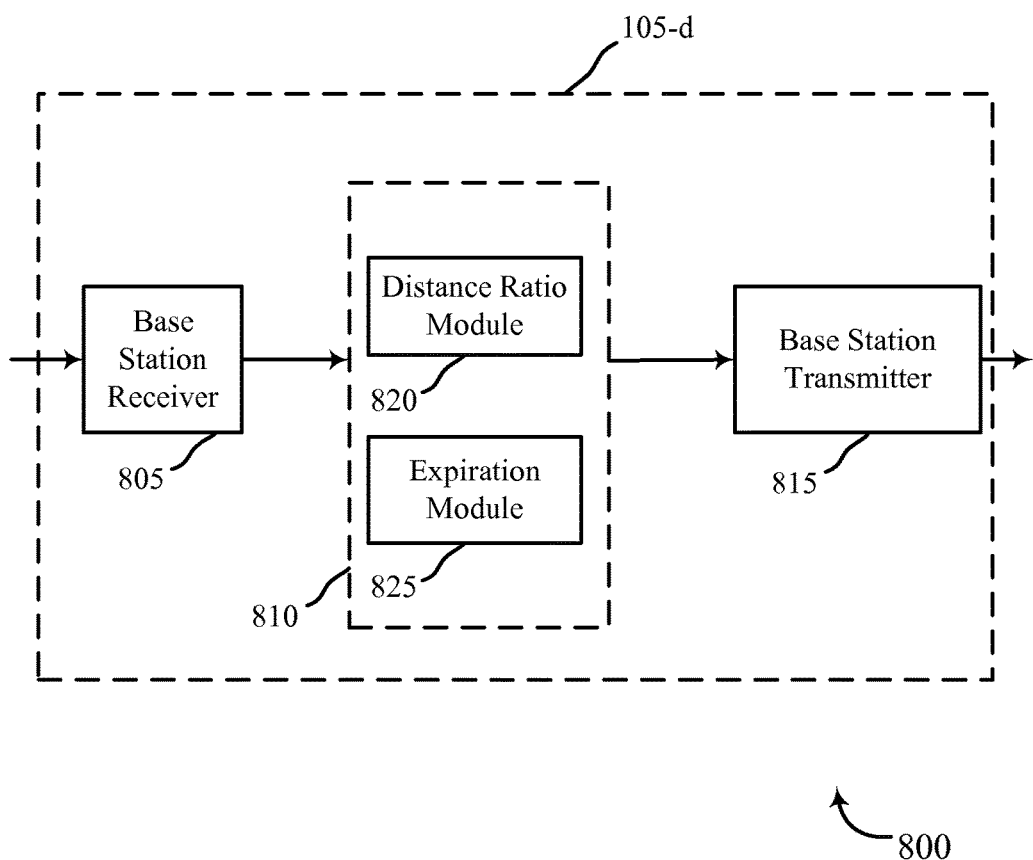
FIG. 8 shows a block diagram of an apparatus for use in wireless communication, in accordance with various aspects of the present disclosure.

FIG. 8 shows a block diagram 800 of a base station 105-*d* that may be used in connection with a vehicular communication network, in accordance with various aspects of the present disclosure. In some examples, the base station 105-*d* may be an example of aspects of one or more of the base stations 105 described with reference to FIGS. 1, 2 and/or 7. In some examples, the base station 105-*d* may be part or include an LTE/LTE-A eNB and/or an LTE/LTE-A base station. The base station 105-*d* may include a base station receiver 805, a base station storage assistance module 810, and/or a base station transmitter 815. Each of these modules may be in communication with each other.

In some examples, the base station receiver 805 may include at least one radio frequency (RF) receiver, such as an RF receiver operable to receive data packets to be forwarded along a vehicular communication network. In other examples, the RF receiver may be operable to receive requests for information from a vehicle in a vehicular communication network. Requests for information received at the base station 105-*d* may include requests for information relating to a data packet's current or original geographical distance and/or requests relating to a data packet's expiration time, for example. The base station receiver 805 may also be used to receive various types of data and/or control signals (i.e., transmissions) over one or more communication links of a wireless communication system, such as one or more communication links 125, 135 of the wireless communication systems 100, 200 described with reference to FIGS. 1 and/or 2.

In some examples, the base station transmitter 815 may include at least one RF transmitter, such as at least one RF transmitter operable to transmit data packets to a vehicle or to transmit information in response to requests received from a vehicle pertaining to data packets that may either be stored or deleted at the vehicle. The base station transmitter 815 may also be used to transmit various types of data and/or control signals (i.e., transmissions) over one or more communication links of a wireless communication system, such as one or more communication links 125, 135 of the wireless communication systems 100, 200 described with reference to FIGS. 1 and/or 2.

In some examples, the base station storage assistance module 810 may be used to assist a vehicle in deciding whether to store or delete a received data packet. While a vehicle may make the storage or deletion decision on its own, it may also contact the base station 105-*d* to obtain additional information pertaining to a received data packet. Thus, the base station storage assistance module 810 may include a distance ratio module 820 and an expiration module 825. The distance ratio module 820 may, at the request of a vehicle, determine a current distance of a received data packet from its intended destination, and may also determine an original distance of the received data packet from its source to its intended destination. The distance ratio module 820 may calculate these distances or may refer to stored predetermined distances. For example, the base station 105-*d* may have access to a data packet's original distance from its source address to its destination address, as this original distance may have been previously stored in a database accessible to the base station 105-*d*. The base station 105-*d* may also have access to an approximate current distance of the data packet to a destination address, based on a predetermined distance between the base station 105-*d* and the data packet destination address (or a base station near the data packet destination address). In either case, the distance ratio module 820 may calculate or otherwise determine the original and current distances for a data packet, as well as its current distance-to-original distance ratio, which may then be communicated to a requesting vehicle.

The expiration module 825 of the base station storage assistance module 810 may be used to respond to requests from a vehicle to determine whether a received data packet has expired. The base station 105-*d* may have access to data indicating an expiration time for a received data packet and may be operable to return that information to a requesting vehicle.

Figure 9:
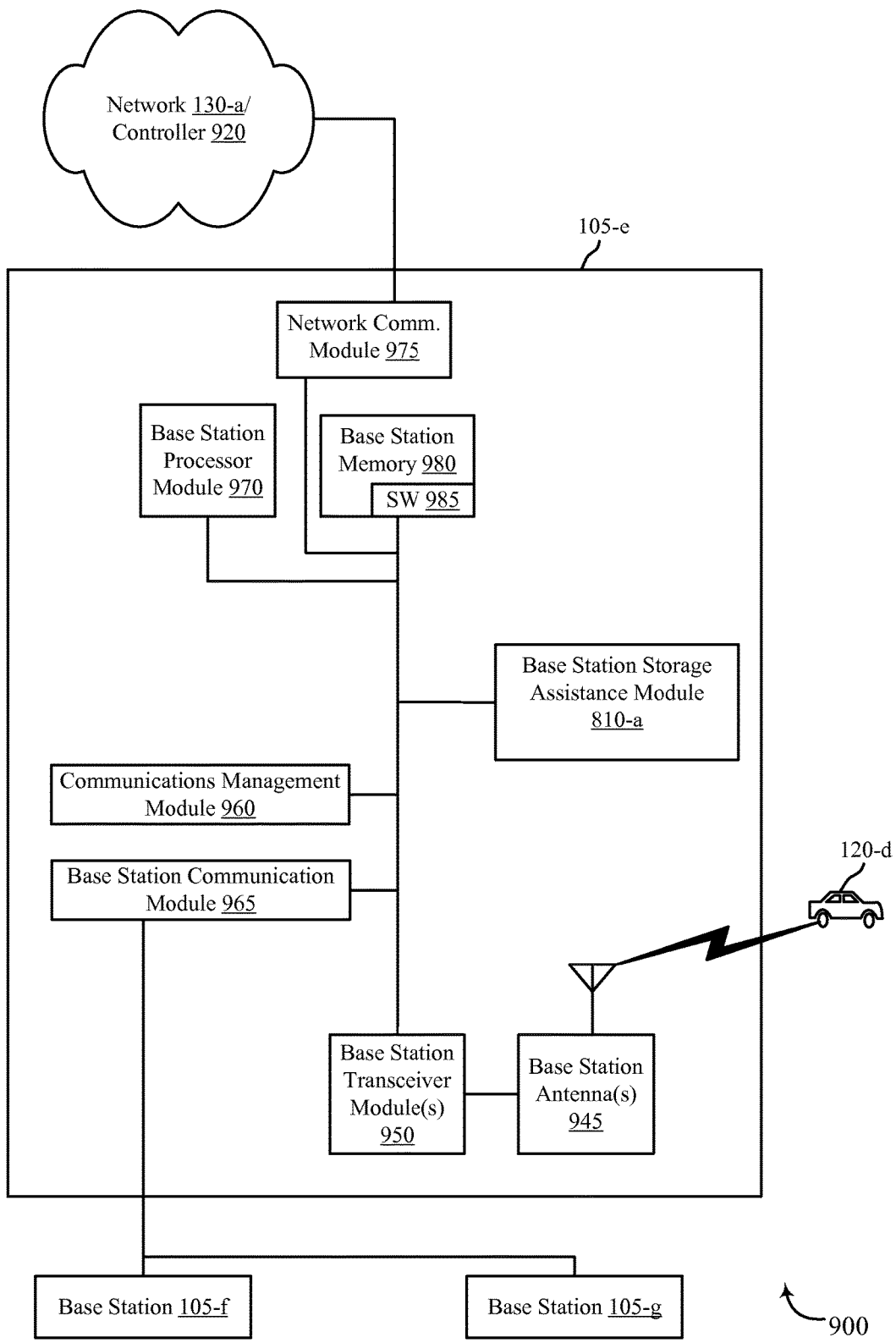
FIG. 9 shows a block diagram of a base station (e.g., a base station forming part or all of an eNB) for use in wireless communication, in accordance with various aspects of the present disclosure.

FIG. 9 shows a block diagram of a system 900 for transferring data packets and other information in a vehicular communication network, in accordance with various embodiments. System 900 includes base stations 105-*e*, 105-*f*, 105-*g*, which may be examples of the base stations 105 in FIGS. 1, 2, 7 and/or 8. System 900 also includes a vehicle 120-*d*, which may be an example of the vehicles 120 in FIGS. 1, 2 and/or 7, and/or the apparatuses 405 in FIGS. 4-6.

The base station 105-*e* may include base station antenna(s) 945, base station transceiver module(s) 950, base station memory 980, and a base station processor module 970, which each may be in communication, directly or indirectly, with each other (e.g., over one or more buses). The base station transceiver module(s) 950 may be configured to communicate bi-directionally, via the base station antenna(s) 945, with the vehicle 120-*d* as well as other vehicles. The base station transceiver module(s) 950 (and/or other components of the base station 105-*e*) may also be configured to communicate bi-directionally with one or more networks. In some cases, the base station 105-*e* may communicate with the core network 130-*a* and/or controller 920 through network communications module 975. The base station 105-*e* may be an example of an eNodeB base station, a Home eNodeB base station, a NodeB base station, and/or a Home NodeB base station. The controller 920 may be integrated into base station 105-*e* in some cases, such as with an eNodeB base station.

The base station 105-*e* may also communicate with other base stations 105, such as base station 105-*f* and base station 105-*g*. Each of the base stations 105 may communicate with one or more vehicles using different wireless communications technologies, such as different radio access technologies. In some cases, base station 105-*e* may communicate with other base stations such as 105-*f* and/or 105-*g* utilizing base station communication module 965. In some embodiments, base station communication module 965 may provide an X2 interface within an LTE wireless communication technology to provide communication between some of the base stations 105. In some embodiments, the base station 105-*e* may communicate with other base stations through controller 920 and/or core network 130-*a*.

The base station memory 980 may include random access memory (RAM) and read-only memory (ROM). The base station memory 980 may also store computer-readable, computer-executable software code 985 containing instructions that are configured to, when executed, cause the base station processor module 970 to perform various functions described herein (e.g., receiving and transmitting data packets and assisting vehicles in determining whether to store or delete a received data packet, etc.). Alternatively, the software code 985 may not be directly executable by the base station processor module 970 but may be configured to cause the computer, e.g., when compiled and executed, to perform functions described herein.

The base station processor module 970 may include an intelligent hardware device, e.g., a central processing unit (CPU), a microcontroller, an application-specific integrated circuit (ASIC), etc. The base station transceiver module 950 may include a modem configured to modulate the packets and provide the modulated packets to the antenna(s) 945 for transmission, and to demodulate packets received from the antenna(s) 945. While some examples of the base station 105-e may include a single antenna 945, the base station 105-e may include multiple antennas 945 for multiple links which may support carrier aggregation. For example, one or more links may be used to support macro communications with mobile vehicles 120.

According to the architecture of FIG. 9, the base station 105-e may further include a communications management module 960. The communications management module 960 may manage communications with other base stations 105. By way of example, the communications management module 960 may be a component of the base station 105-e in communication with some or all of the other components of the base station 105-e via a bus. Alternatively, functionality of the communications management module 960 may be implemented as a component of the base station transceiver module 950, as a computer program product, and/or as one or more controller elements of the base station processor module 970.

The base station 105-e in FIG. 9 also includes a base station storage assistance module 810-a, which may be an example of the base station storage assistance module 810 of FIG. 8. The base station storage assistance module 810-a in FIG. 9 may function to provide assistance to requesting vehicles in deciding whether to store or delete a received data packet. In particular, the base station storage assistance module 810-a may provide information pertaining to a data packet's current and original distances as well as its expiration times.

Figure 10:
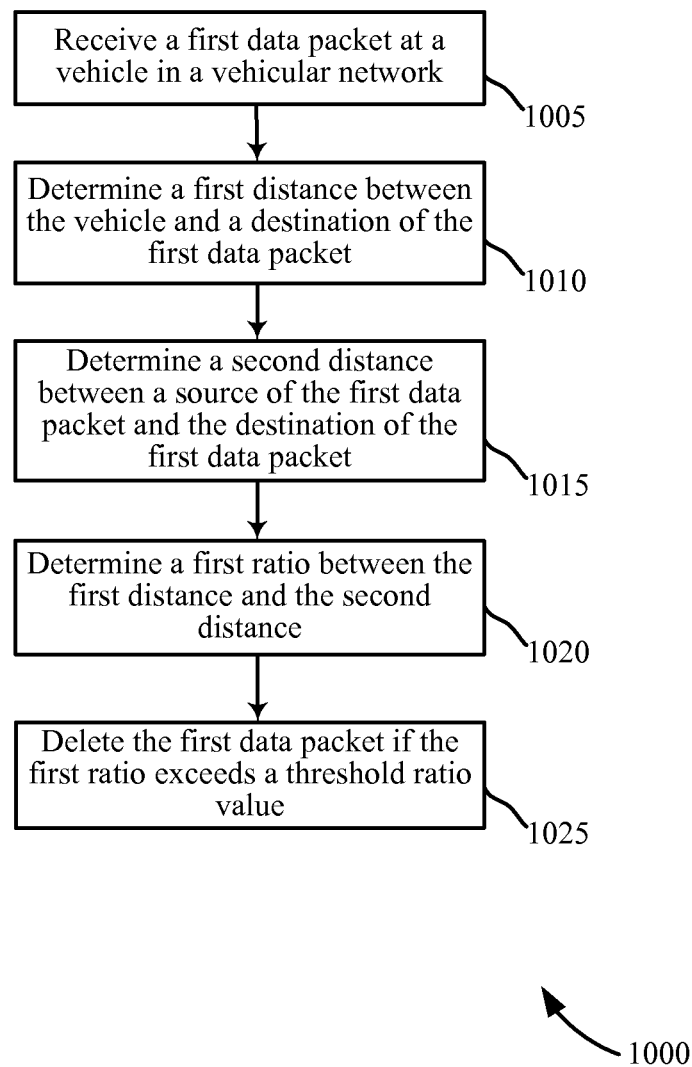
FIGS. 10 and 11 are flow charts illustrating an example of a method for wireless communication using a vehicular network, in accordance with various aspects of the present disclosure.

FIG. 10 shows a flowchart of an example of a method 1000 for wireless communication in accordance with various embodiments. The functions of the method 1000 may be implemented by an apparatus 405 as described above with reference to FIGS. 4-7 and/or a vehicle 120 as described above with reference to FIGS. 1, 2 and/or 7, or any combination of these or any one of their components.

At block 1005, a first data packet may be received at a vehicle in a vehicular network. The vehicle may be a vehicle 120 and may have received the first data packet from a source. The source may be a stationary node, or may be a vehicle. The data packet may be an example of the data packet 300 as described above with reference to FIG. 3.

At block 1010, method 1000 may include determining a first distance between the vehicle and a destination of the first data packet. The determined distance is referred to above as a current distance and may be determined either at the vehicle or by through use of information received at the vehicle in response to a vehicle request. The determined first distance may represent a shortest or quickest geographical route between the vehicle and the destination address of the first data packet. The destination address of the first data packet may be determined with reference to a destination address field of the first data packet.

At block 1015, method 1000 may include determining a second distance between a source of the first data packet and the destination of the first data packet. The determined distance is referred to above as an original distance and may be determined either at the vehicle or by through use of information received at the vehicle in response to a vehicle request. The determined second distance may represent a shortest or quickest geographical route between the data packet's source address and the destination address of the first data packet. The source address and the destination address of the first data packet may be determined with reference to a source address field and a destination address field, respectively, of the first data packet.

At block 1020, method 1000 may include determining a first ratio between the first distance and the second distance. At block 1025, the determined ratio may be used to delete the first data packet if the first ratio exceeds a threshold ratio value. The threshold ratio value may be predetermined and may be greater than one, indicating that the data packet is traveling away from its destination.

Figure 11:
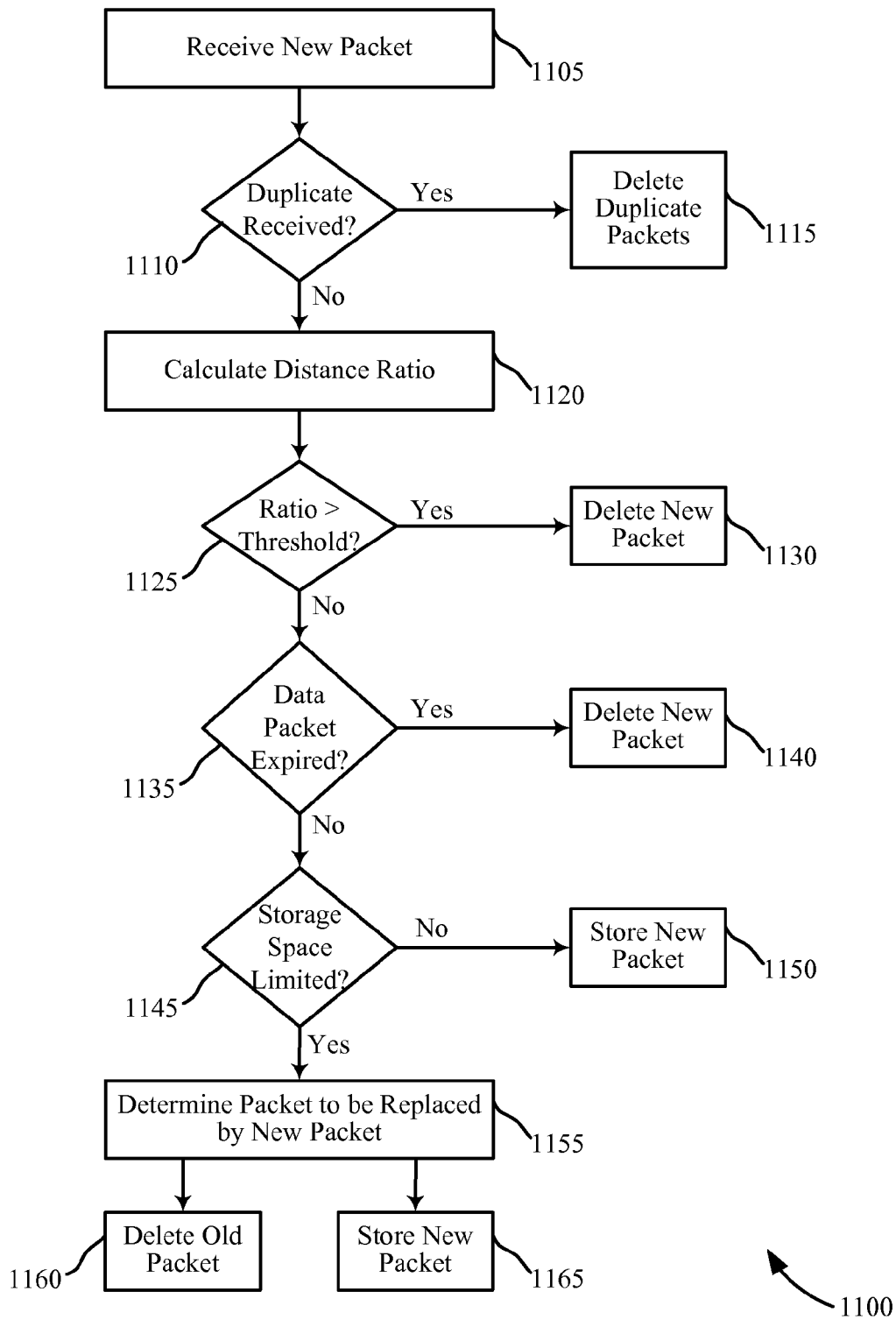

FIG. 11 shows a flowchart of an additional example of a method 1100 for wireless communication in accordance with various embodiments. The functions of the method 1100 may be implemented by an apparatus 405 as described above with reference to FIGS. 4-7 and/or a vehicle 120 as described above with reference to FIGS. 1, 2 and/or 7, or any combination of these or any one of their components.

At block 1105, a new data packet may be received at a vehicle in a vehicular network. The vehicle may be a vehicle 120 and may have received the new data packet from a source. The source may be a stationary node, or may be a vehicle. The data packet may be an example of the data packet 300 as described above with reference to FIG. 3.

At block 1110, the newly received data packet is compared with other previously received data packets to determine whether the newly received data packet is a duplicate of any previously received data packets. If it is, both of the duplicate data packets are deleted at block 1115.

If the newly received data packet is not a duplicate, then a distance ratio for the newly received data packet is calculated at block 1120. The distance ratio may be a ratio of the data packet's current distance to its destination address and the data packet's original distance from its source address to its destination address. The information used to determine the ratio may be obtained through the data packet itself (e.g., the data packet's source and destination address fields), a navigation system or GPS, or via a base station, for example.

At block 1125, the calculated distance ratio is compared with a distance ratio threshold. If the calculated distance ratio is greater than the predetermined distance ratio threshold, then the newly received data packet is deleted at block 1130.

If the calculated distance ratio is not greater than the predetermined distance ratio, then the newly received data packet is evaluated at block 1135 to determine whether the data packet has expired. To do this, the timeout field may be evaluated to determine whether the data packet is still relevant. Alternatively, information received from a base station may indicate whether the data packet is still valid. If the data packet has expired, the newly received data packet is deleted at block 1140.

If the newly received data packet is not a duplicate (as determined at block 1110), has an acceptable distance ratio (as determined at block 1125), and has not expired (as determined at block 1135), the newly received data packet may be stored at the vehicle. However, at block 1145, the method 1100 includes determining whether the vehicle has limited storage space. If there are no constraints on storage space, the newly received packet is stored at block 1150. If, however, the vehicle storage space is constrained, the newly received data packet may be stored by replacing a different previously received (and stored) data packet.

At block 1155, the method 1100 includes determining a previously received data packet to be replaced by the newly received data packet. This may include consideration of how long a previously received data packet has been stored as well as a comparison of the distance ratios for the previously received data packet and the newly received data packet. Once a previously received data packet has been identified (at block 1155), the previously received data packet is deleted (at block 1160) while the newly received data packet is stored (at block 1165).

It should be noted that the methods 1000 and 1100 are just example embodiments of the operations described with relation to the methods 1000 and 1100, and that the steps may be rearranged or otherwise modified such that other embodiments are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   receiving a first data packet at a vehicle in a vehicular network;
   storing the first data packet at a memory of the vehicle;
   determining a first distance between the vehicle and a destination of the first data packet;
   determining a second distance between a source of the first data packet and the destination of the first data packet;
   determining a first ratio between the first distance and the second distance; and
   determining whether to delete, without transmitting, the first data packet from the memory of the vehicle or to continue to store the first data packet in the memory of the vehicle, the determining based at least in part on whether the first ratio exceeds a threshold ratio value.

2. The method of claim 1, wherein determining the first distance comprises:
   determining a current route between the vehicle and the destination of the first data packet; and wherein determining the second distance comprises:
determining an original route between the source of the first data packet and the destination of the first data packet.

3. The method of claim 2, wherein the current route and the original route are associated with a distance.

4. The method of claim 2, wherein the current route and the original route are associated with a time period.

5. The method of claim 1, further comprising:
deleting the first data packet if a duplicate of the first data packet was previously received by the vehicle.

6. The method of claim 1, further comprising:
deleting the first data packet if the first data packet is older than an expiration time indicated by the first data packet.

7. The method of claim 1, further comprising:
determining a second ratio for a previously received data packet when an available storage space of the vehicle is below a threshold storage value, the second ratio being a ratio of a third distance between the vehicle and a previously received data packet destination and a fourth distance between a previously received data packet source and the previously received data packet destination; and
deleting one of the first data packet or the previously received data packet based at least in part on a comparison of the first ratio and the second ratio.

8. The method of claim 7, wherein deleting one of the first data packet or the previously received data packet comprises:
determining which of the first ratio and the second ratio is higher; and
deleting either the first data packet or the previously received data packet that corresponds to the higher of the first ratio and the second ratio.

9. The method of claim 1, further comprising:
deleting one of the first data packet or a second received data packet based on a comparison of data packet storage time in a storage space for the vehicle.

10. The method of claim 1, further comprising:
determining the first ratio at a time that the first data packet is received.

11. The method of claim 1, further comprising:
determining the first ratio periodically after the first data packet is received.

12. The method of claim 1, wherein the first data packet may be stored, deleted or forwarded.

13. The method of claim 1, wherein the threshold ratio value is larger than one.

14. An apparatus for wireless communication, comprising:
means for receiving a first data packet at a vehicle in a vehicular network;
means for storing the first data packet at a memory of the vehicle;
means for determining a first distance between the vehicle and a destination of the first data packet;
means for determining a second distance between a source of the first data packet and the destination of the first data packet;
means for determining a first ratio between the first distance and the second distance; and
means for determining whether to delete, without transmitting, the first data packet from the memory of the vehicle or to continue to store the first data packet in the memory of the vehicle, the determining based at least in part on whether the first ratio exceeds a threshold ratio value.

15. The apparatus of claim 14, wherein the means for determining the first distance comprises:
means for determining a current route between the vehicle and the destination of the first data packet; and
wherein the means for determining the second distance comprises:
means for determining an original route between the source of the first data packet and the destination of the first data packet.

16. The apparatus of claim 14, further comprising:
means for deleting the first data packet if a duplicate of the first data packet was previously received by the vehicle.

17. The apparatus of claim 14, further comprising:
means for deleting the first data packet if the first data packet is older than an expiration time indicated by the first data packet.

18. The apparatus of claim 14, further comprising:
means for determining a second ratio for a previously received data packet when an available storage space of the vehicle is below a threshold storage value, the second ratio being a ratio of a third distance between the vehicle and a previously received data packet destination and a fourth distance between a previously received data packet source and the previously received data packet destination; and
means for deleting one of the first data packet or the previously received data packet based at least in part on a comparison of the first ratio and the second ratio.

19. The apparatus of claim 18, wherein the means for deleting one of the first data packet or the previously received data packet comprises:
means for determining which of the first ratio and the second ratio is higher; and
means for deleting either the first data packet or the previously received data packet that corresponds to the higher of the first ratio and the second ratio.

20. The apparatus of claim 14, further comprising:
means for deleting one of the first data packet or a second received data packet based on a comparison of data packet storage time in a storage space for the vehicle.

21. The apparatus of claim 14, further comprising:
means for determining the first ratio at a time that the first data packet is received.

22. The apparatus of claim 14, further comprising:
means for determining the first ratio periodically after the first data packet is received.

23. An apparatus for wireless communication, comprising:
a processor;
memory in electronic communication with the processor; and
instructions stored in the memory, wherein the processor executes the instructions to:
receive, by a receiver, a first data packet at a vehicle in a vehicular network;
store the first data packet at a memory of the vehicle;
determine a first distance between the vehicle and a destination of the first data packet;
determine a second distance between a source of the first data packet and the destination of the first data packet;
determine a first ratio between the first distance and the second distance; and
determine whether to delete, without transmitting, the first data packet from the memory of the vehicle or to continue to store the first data packet in the memory of the vehicle, the determining based at least in part on whether the first ratio exceeds a threshold ratio value.

24. The apparatus of claim 23, wherein the instructions for determining the first distance comprise instructions to:
determine a current route between the vehicle and the destination of the first data packet; and
wherein the instructions for determining the second distance comprise instructions to:
determine an original route between the source of the first data packet and the destination of the first data packet.

25. The apparatus of claim 23, the instructions further comprising instructions to:
delete the first data packet if a duplicate of the first data packet was previously received by the vehicle.

26. The apparatus of claim 23, the instructions further comprising instructions to:
delete the first data packet if the first data packet is older than an expiration time indicated by the first data packet.

27. A non-transitory computer-readable medium storing computer-executable code for wireless communication, the code executable by a processor to:
receive a first data packet at a vehicle in a vehicular network;
store the first data packet at a memory of the vehicle;
determine a first distance between the vehicle and a destination of the first data packet;
determine a second distance between a source of the first data packet and the destination of the first data packet;
determine a first ratio between the first distance and the second distance; and
determining whether to delete, without transmitting, the first data packet from the memory of the vehicle or to continue to store the first data packet in the memory of the vehicle, the determining based at least in part on whether the first ratio exceeds a threshold ratio value.

28. The non-transitory computer-readable medium of claim 27, wherein the code for determining the first distance comprises code executable by a processor to:
determine a current route between the vehicle and the destination of the first data packet; and
wherein the code for determining the second distance comprises code executable by a processor to:
determine an original route between the source of the first data packet and the destination of the first data packet.

29. The non-transitory computer-readable medium of claim 27, the code further comprising code executable by a processor to:
delete the first data packet if a duplicate of the first data packet was previously received by the vehicle.

30. The non-transitory computer-readable medium of claim 27, the code further comprising code executable by a processor to:
delete the first data packet if the first data packet is older than an expiration time indicated by the first data packet.

* * * * *